(12) United States Patent
Jindal et al.

(10) Patent No.: US 10,759,376 B2
(45) Date of Patent: Sep. 1, 2020

(54) VEHICLE AIRBAG

(71) Applicant: Ford Global Technologies, LLC, Dearborn, MI (US)

(72) Inventors: Pardeep Kumar Jindal, Canton, MI (US); Rahul Makwana, Dearborn Heights, MI (US); Dinkar Sadashiv Karanth, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/055,349

(22) Filed: Aug. 6, 2018

(65) Prior Publication Data
US 2020/0039462 A1 Feb. 6, 2020

(51) Int. Cl.
| | |
|---|---|
| *B60R 21/2338* | (2011.01) |
| *B60R 21/21* | (2011.01) |
| *B60R 21/01* | (2006.01) |
| *B60R 21/231* | (2011.01) |
| *B60R 21/00* | (2006.01) |

(52) U.S. Cl.
CPC .......... *B60R 21/2338* (2013.01); *B60R 21/21* (2013.01); *B60R 21/01* (2013.01); *B60R 21/23138* (2013.01); *B60R 2021/0004* (2013.01); *B60R 2021/0006* (2013.01); *B60R 2021/0053* (2013.01); *B60R 2021/23169* (2013.01); *B60R 2021/23382* (2013.01)

(58) Field of Classification Search
CPC ..... B60R 21/2338; B60R 21/21; B60R 21/01; B60R 21/23138; B60R 2021/0004; B60R 2021/0006; B60R 2021/0053; B60R 2021/23169; B60R 2021/23382

USPC ....................................................... 280/743.2
See application file for complete search history.

(56) References Cited

U.S. PATENT DOCUMENTS

| | | | | |
|---|---|---|---|---|
| 3,981,520 A | * | 9/1976 | Pulling | B60N 2/4221 280/730.2 |
| 4,805,930 A | * | 2/1989 | Takada | B60R 21/239 280/728.1 |
| 4,966,388 A | * | 10/1990 | Warner | B60R 21/0136 280/730.1 |

(Continued)

FOREIGN PATENT DOCUMENTS

| | | | | |
|---|---|---|---|---|
| EP | 1870297 A1 | * | 12/2007 | ........... B60R 21/045 |
| FR | 2927592 A1 | * | 2/2008 | ........... B60R 21/207 |

(Continued)

OTHER PUBLICATIONS

Translation of FR 2927592 accessed at: espacenet on Feb. 10, 2020 (Year: 2008).*

*Primary Examiner* — Paul N Dickson
*Assistant Examiner* — Hilary L Johns
(74) *Attorney, Agent, or Firm* — Frank A. MacKenzie; Bejin Bieneman PLC

(57) ABSTRACT

A vehicle includes a seat having a seat bottom and defining a seat-forward direction. The vehicle includes an interior component. The vehicle includes an airbag supported by the interior component and inflatable to an inflated position having a main body elongated along a vehicle-longitudinal axis and an extension extending from the main body transverse to the vehicle-longitudinal axis in front of the seat bottom relative to the seat-forward direction.

18 Claims, 7 Drawing Sheets

(56) References Cited

U.S. PATENT DOCUMENTS

| | | | | |
|---|---|---|---|---|
| 5,312,131 A | * | 5/1994 | Kitagawa | B60R 21/206 280/730.2 |
| 5,398,254 A | | 3/1995 | Miya et al. | |
| 6,398,254 B2 | * | 6/2002 | David | B60R 21/21 280/730.2 |
| 7,055,853 B2 | * | 6/2006 | Honda | B60R 21/21 280/730.2 |
| 7,661,700 B2 | * | 2/2010 | Imamura | B60R 21/203 280/730.1 |
| 8,215,665 B2 | * | 7/2012 | Ohara | B60R 21/206 280/729 |
| 8,408,589 B2 | * | 4/2013 | Fukawatase | B60R 21/2165 280/728.3 |
| 8,480,125 B1 | * | 7/2013 | Belwafa | B60R 21/21 280/730.2 |
| 8,500,161 B2 | * | 8/2013 | Chavez | B60R 21/206 280/730.1 |
| 8,505,969 B2 | * | 8/2013 | Mendez | B60R 21/206 280/729 |
| 8,602,447 B2 | * | 12/2013 | Ohshino | B60R 21/201 280/730.1 |
| 8,696,019 B2 | * | 4/2014 | Chavez | B60R 21/206 280/728.2 |
| 8,894,095 B1 | * | 11/2014 | Meister | B60R 21/23138 280/728.1 |
| 9,211,860 B2 | * | 12/2015 | Muraji | B60R 21/23138 |
| 9,227,587 B1 | * | 1/2016 | Belwafa | B60R 21/205 |
| 9,682,681 B1 | * | 6/2017 | Patel | B60R 21/239 |
| 9,731,675 B2 | * | 8/2017 | Sadr | B60R 21/13 |
| 2005/0098986 A1 | * | 5/2005 | Kitagawa | B60R 21/206 280/730.1 |
| 2008/0061538 A1 | * | 3/2008 | Mohammad | B60R 21/207 280/730.2 |
| 2008/0122205 A1 | * | 5/2008 | Imamura | B60R 21/203 280/730.1 |
| 2008/0129024 A1 | * | 6/2008 | Suzuki | B60R 21/23138 280/734 |
| 2011/0278826 A1 | * | 11/2011 | Fukawatase | B60R 21/231 280/730.2 |
| 2014/0291972 A1 | * | 10/2014 | Fukawatase | B60R 21/231 280/729 |
| 2015/0115579 A1 | * | 4/2015 | Abramoski | B60R 21/231 280/730.1 |
| 2015/0123385 A1 | * | 5/2015 | Abele | B60R 21/231 280/730.1 |
| 2016/0052636 A1 | * | 2/2016 | Moeller | B64D 25/02 244/121 |
| 2016/0311392 A1 | * | 10/2016 | Jindal | B60R 21/231 |
| 2018/0319358 A1 | * | 11/2018 | Schneider | B60R 21/233 |

FOREIGN PATENT DOCUMENTS

| | | |
|---|---|---|
| JP | 2010120411 A | 6/2010 |
| JP | 6052077 B2 | 12/2016 |

* cited by examiner

VEHICLE AIRBAG

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1:
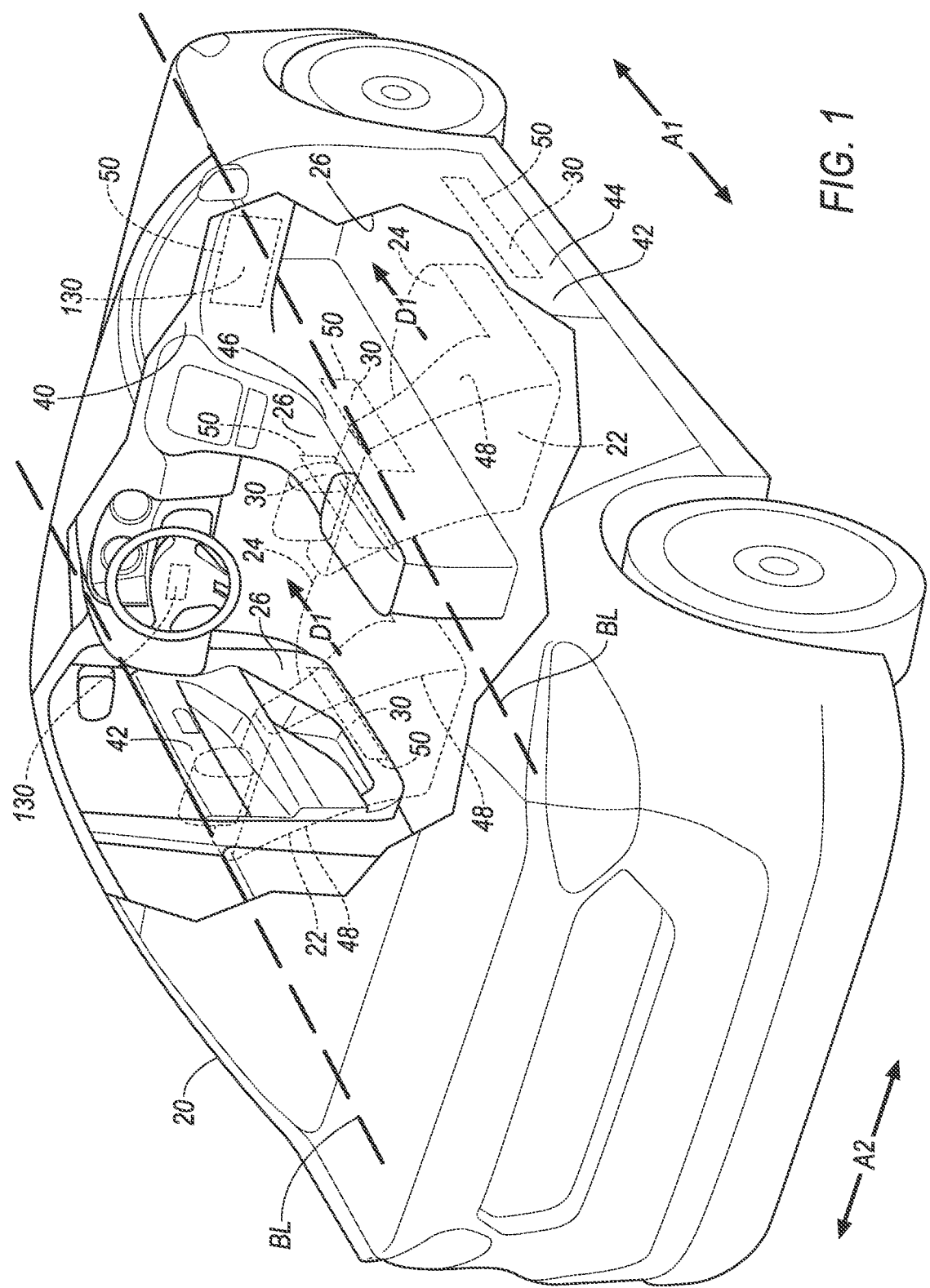
FIG. 1 is a perspective view of a vehicle having airbags in uninflated positions.

A vehicle includes a seat having a seat bottom and defining a seat-forward direction. The vehicle includes an interior component. The vehicle includes an airbag supported by the interior component and inflatable to an inflated position having a main body elongated along a vehicle-longitudinal axis and an extension extending from the main body transverse to the vehicle-longitudinal axis in front of the seat bottom relative to the seat-forward direction.

The vehicle may include a tether fixed to the extension and a tether release operatively coupled to the tether.

The vehicle may include a processor and a memory storing instructions executable by the processor to actuate the tether release based on a direction of a detected vehicle impact.

The vehicle may include a processor and a memory storing instructions executable by the processor to actuate the tether release based on a detected occupant size.

The vehicle may include a processor and a memory storing instructions executable by the processor to inflate the airbag and then actuate the tether release.

The airbag may be inflatable to a second inflated position having the extension in the main body before the tether is released.

The airbag in the inflated position may be L-shaped after the tether is released.

The extension may be at a front of the main body.

The interior component may be a door.

The interior component may be a center console.

The extension may extend in a cross-vehicle direction.

The vehicle may include an instrument panel, and the extension of the airbag in the inflated position may be between the seat bottom and the instrument panel.

The vehicle may include a second airbag supported by the instrument panel and inflatable to an inflated position above the airbag in the inflated position.

The extension may be spaced from the seat bottom in the seat-forward direction.

The seat bottom may define a centerline, and the extension may extend toward the centerline.

The airbag may be supported below a vehicle-beltline.

The airbag in the inflated position may be completely below a vehicle-beltline.

The vehicle may include a second interior component and a second airbag supported by the second interior component and inflatable to an inflated position having a second extension, the extension and the second extension extending toward each other.

The interior component may be a center console and the second interior component may be a door.

The extension in the inflated position may abut the second extension in the inflated position.

With reference to the Figures, wherein like numerals indicate like parts throughout the several views, a vehicle 20 includes a seat 22 having a seat bottom 24 and defining a seat-forward direction D1. The vehicle 20 includes an interior component 26. The vehicle 20 includes an airbag 30 supported by the interior component 26 and inflatable to a first inflated position having a main body 32 elongated along a longitudinal axis A1 and an extension 34 extending from the main body 32 transverse to the longitudinal axis A1 in front of the seat bottom 24 relative to the seat-forward direction D1. The vehicle 20 may include a tether 36 and a tether release 38 that selectively maintains the extension 34 in the main body 32, e.g., such that the airbag 30 may be inflated to a second inflated position with the extension 34 in the main body 32. The adjectives "first" and "second" are used throughout this document as identifiers and are not intended to signify importance or order.

The airbags 30 in the inflated positions control kinematics of an occupant of the seat 22, e.g., the main body 32 in the first inflated position and/or the second inflated position may control kinematics of the occupant during a side impact D2, the main body 32 and the extension 34 in the first inflated position may control kinematics of the occupant during an oblique impact D4, and the extension 34 may control kinematics of the occupant during a front impact D3.

The vehicle 20 may be any passenger or commercial automobile such as a car, a truck, a sport utility vehicle, a crossover vehicle, a van, a minivan, a taxi, a bus, etc. The vehicle 20 may define the longitudinal axis A1, e.g., extending between a front and a rear of the vehicle 20. The vehicle 20 may define a cross-vehicle axis A2, e.g., extending between a left side and a right side of the vehicle 20. The longitudinal axis A1 and the cross-vehicle axis A2 may be perpendicular to each other. The front, rear, left and right sides, etc., may be relative to an orientation of the occupant of the vehicle 20. The front, rear, left and right sides, etc., may be relative to an orientation of controls for operating the vehicle 20, e.g., an instrument panel 40. The front, rear, left and right sides, etc., may be relative to a driving direction of the vehicle 20 when wheels of the vehicle 20 are all parallel with each other, etc.

The vehicle 20 may include a door 42. The door 42 may move between an open position and a closed position. The door 42 in the open position permits an occupant to enter and exit the vehicle 20. The door 42 in the closed position restricts entry and exit of the occupant to and from the vehicle 20. The door 42 may include a frame. The frame may be metal (e.g., aluminum, steel, etc.), composite material (e.g., fiber reinforced thermoplastic, sheet molding compound (SMC), etc., or any suitable material. The door 42 may include a trim panel. The trim panel may be fixed to the frame in any suitable way, e.g., threaded fasteners, clips, push-pins, Christmas tree fasteners, etc. The trim panel may be formed of plastic, foam, leather, vinyl, etc. and combinations thereof.

The vehicle 20 may include body panels 44. The body panels 44 may have class-A surface, i.e., a surface specifically manufactured to have a high-quality, finished aesthetic appearance free of blemishes, facing exteriorly relative to the vehicle 20. The body panels 44 may be supported by the frame of the door 42, may be a hood of the vehicle 20, a quarter panel of the vehicle 20, etc.

The vehicle 20 may define a beltline BL. The beltline BL extends along a bottom edge of one or more of windows of the vehicle 20. In other words, the beltline BL may be where the windows meet the body panels 44 that are below the windows. The beltline BL may be generally horizontal. Vertically, the beltline BL may be generally at a mid-point of the vehicle 20, i.e., generally at mid-height of the vehicle.

The interior component 26 is interior of the vehicle 20, e.g., relative to the body panels 44. For example, the interior component 26 may be the center console 46. As another example, the interior component 26 may be the door 42, e.g., the frame of the door 42, the trim panel of the door 42, etc.

The seat 22 shown is a bucket seat, but alternatively the seat 22 may be a bench seat or another type of seat.

The seat 22 may include a seat back 48, a seat bottom 24, and a head restraint. The head restraint may be supported by the seat back 48 and may be stationary or movable relative to the seat back 48. The seat back 48 may be supported by the seat bottom 24 and may be stationary or movable relative to the seat bottom 24. The seat back 48, the seat bottom 24, and/or the head restraint may be adjustable in multiple degrees of freedom. Specifically, the seat back 48, the seat bottom 24, and/or the head restraint may themselves be adjustable, in other words, adjustable components within the seat back 48, the seat bottom 24, and/or the head restraint, and/or may be adjustable relative to each other.

The seat 22 may define the seat-forward direction D1. The seat 22 forward direction extends forward relative to the seat 22. For example, the seat-forward direction D1 may extend from a rear of the seat 22 toward a front of the seat 22 relative to an occupant of the seat 22. As another example, the seat bottom 24 may extend from the seat back 48 in the seat-forward direction D1.

The seat bottom 24 may define a centerline CL. The centerline CL may extend between the front and the rear of the seat 22 and bisect the seat bottom 24. For example, the centerline CL may extend from the seat back 48 in the seat-forward direction D1 and be midway between a right side of the seat 22 and a left side of the seat 22. The right side and left side of the seat 22 may be relative to an occupant of the seat 22.

The vehicle 20 may include the instrument panel 40. The instrument panel 40 may be disposed at a forward end of the passenger cabin and face toward the seats 22. The instrument panel 40 may include vehicle controls, e.g., a steering wheel etc.

The vehicle 20 may include the center console 46. The center console 46 may be between the seats 22. The center console 46 may be elongated along the longitudinal axis A1. The center console 46 may include an armrest, cupholders, etc.

The vehicle 20 may include one or more airbags 30. The airbags 30 may be formed of a woven polymer or any other material. As one example, the airbags 30 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

Each airbag 30 may be supported by one of the interior components 26, e.g., via housings 50 (described below). The airbags 30 may be supported below the beltline BL, e.g., relative to a top and a bottom of the vehicle 20, relative to an occupant of the vehicle 20, etc. For example, the beltline BL may be between the airbags 30 and a roof of the vehicle 20. For example, the airbag 30 may be supported by the center console 46. As another example, the airbag 30 may be supported by the door 42, e.g., fixed to the frame of the door 42, an inner surface of the trim panel, etc.

Figure 2:
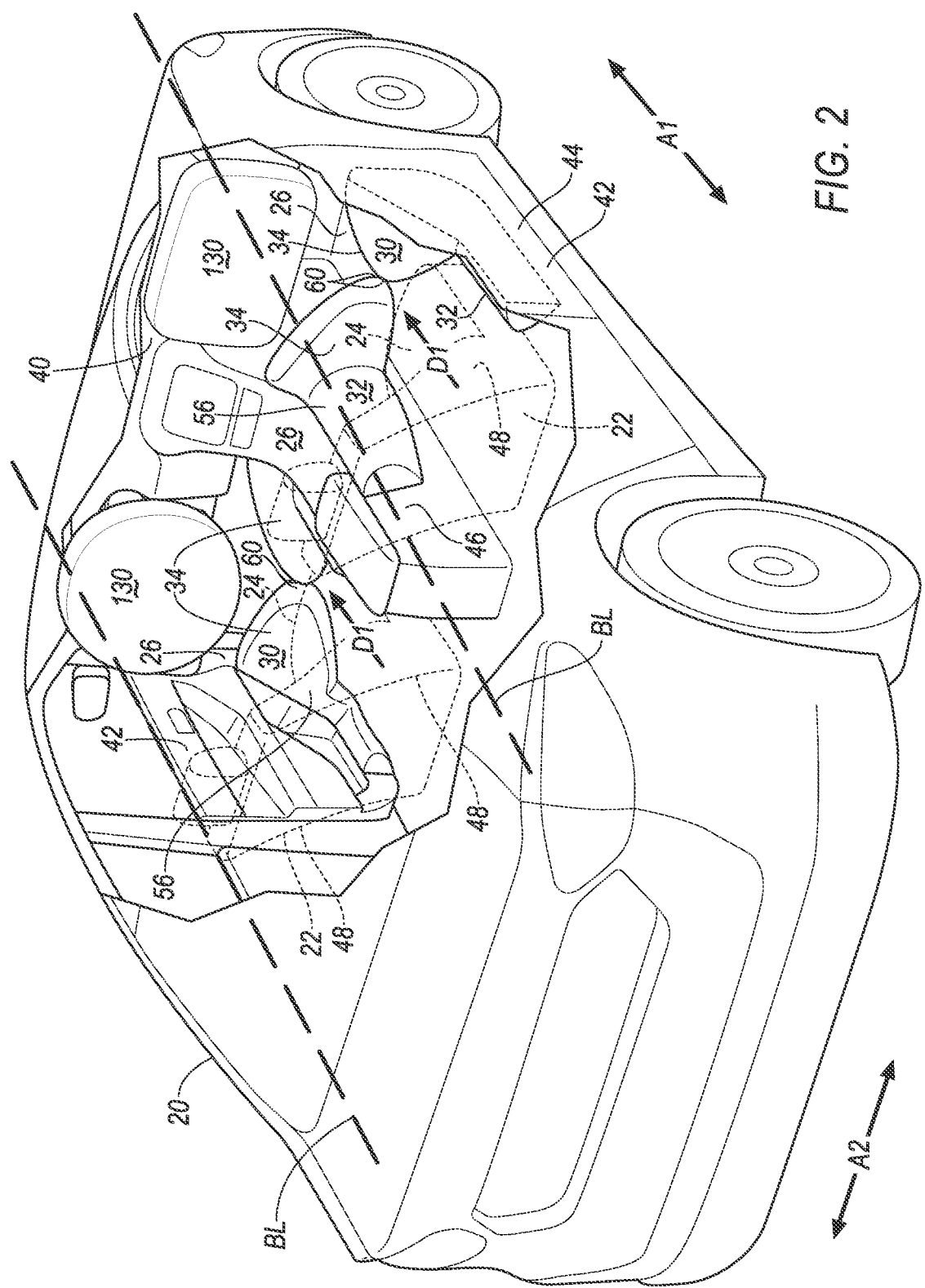
FIG. 2 is a perspective view of the vehicle having the airbags in first inflated positions.
Figure 3:
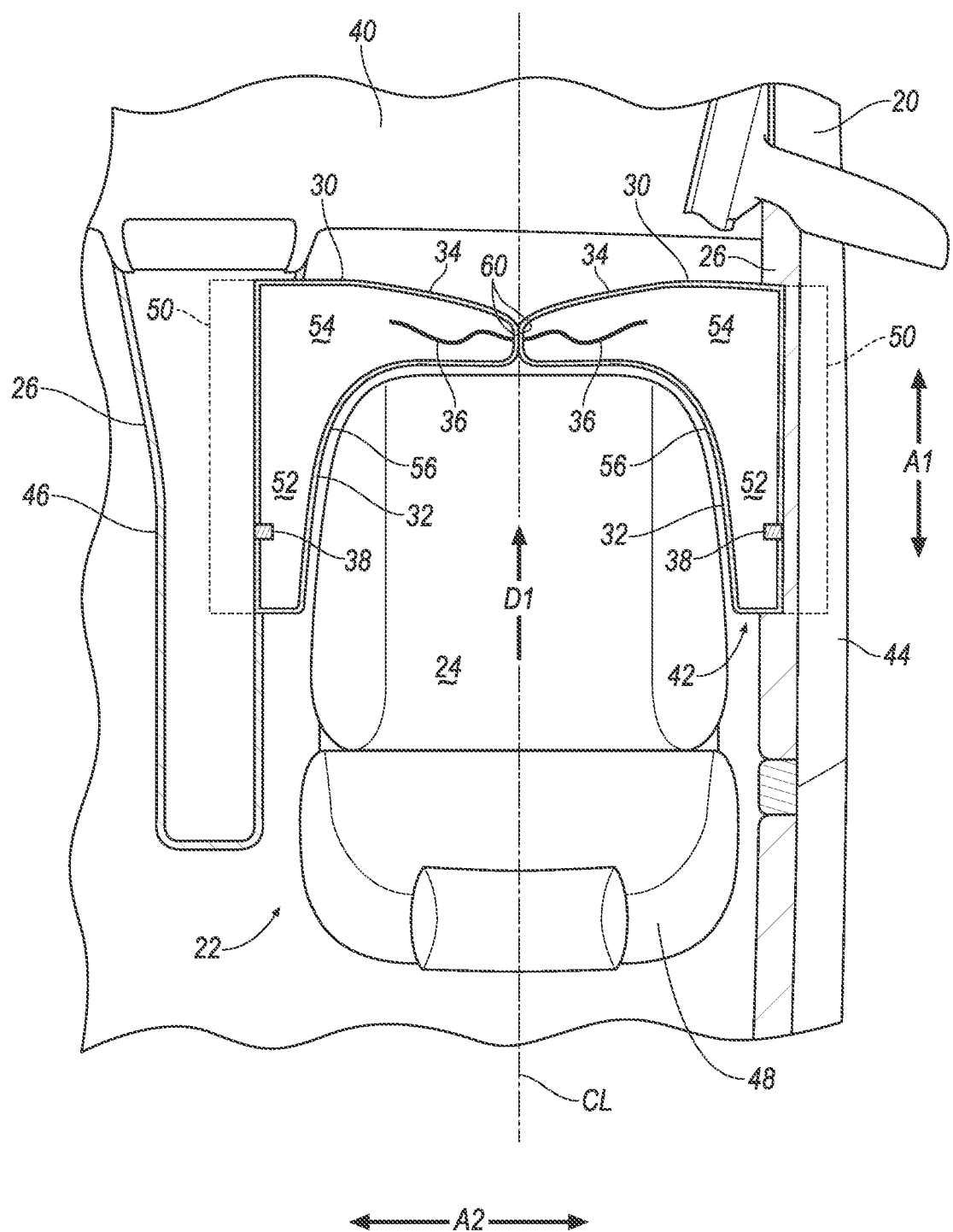
FIG. 3 is a top cross-section view of the vehicle having the airbags in the first inflated positions.

The airbags 30 may be inflatable from uninflated positions, shown in FIG. 1, to the first inflated positions, shown in FIGS. 2 and 3. The airbags 30 in the first inflated positions may be completely below the beltline BL. In other words, the airbags 30 in the first inflated positions may not extend above the beltline BL, e.g., relative to the top and the bottom of the vehicle 20, relative to an occupant of the vehicle 20, etc.

The airbags 30 in the first inflated positions each include the main body 32. The main body 32 may enclose a chamber 52. The chamber 52 may be filled with inflation medium when the airbag 30 is inflated. The main body 32 is elongated along the longitudinal axis A1. For example, the main body 32 may extend along the center console 46, the door 42, etc., towards the front and the rear of the vehicle 20.

The airbags 30 in the first inflated positions each include the extension 34. The extensions 34 may each enclose a chamber 54. The chamber 54 of the extensions 34 may be in fluid communication with the chamber 52 of the respective main body 32. In other words, inflation medium may flow from the chamber 52 of one the main bodies 32 to the chamber 54 of the respective extension 34.

The extensions 34 extend from the main body 32 of the respective airbag 30 transverse to the longitudinal axis A1. For example, each extension 34 may extend toward the right side or the left side of the vehicle 20 in the first inflated positions. As another example, each extension 34 may extend toward the centerline CL of the seat 22 in the first inflated positions. In other words, the extension 34 of the airbag 30 supported by the center console 46 and the extension 34 of the airbag 30 supported by the door 42 may extend toward each other in the first inflated positions. As another example, each extension 34 may extend along cross-vehicle direction in the first inflated positions. The cross-vehicle direction may be perpendicular to the seat forward direction D1. The cross-vehicle direction may be along, i.e., parallel to, the cross-vehicle axis A2. For example, the cross-vehicle direction may be perpendicular to the longitudinal axis A1.

The extensions 34 in the first inflated positions may be at a front 56 of the main body 32, e.g., relative to the front and rear of the vehicle 20, relative to the seat-forward direction D1, relative to an occupant of the vehicle 20, etc. For example, the airbag 30 in the inflated position may be L-shaped, e.g., when viewed from above.

The extensions 34 in the first inflated positions are in front of the seat bottom 24 relative to the seat-forward direction D1. For example, the extensions 34 in the first inflated positions may be between the seat bottom 24 and the instrument panel 40, e.g., along the longitudinal axis A1. The extensions 34 in the first inflated positions may be spaced from the seat bottom 24 in the seat-forward direction D1. For example, the extensions 34 may be spaced from the seat bottom 24 such that legs of an occupant of the seat 22 may be positioned between the extensions 34 in the first inflated positions and the seat bottom 24.

The extension 34 of the airbag 30 supported by the center console 46 may abut the extension 34 of the airbag 30 supported by the door 42 in the first inflated positions. For example, the extension 34 may each extend to a distal end 60 spaced from the respective main body 32 and the distal ends 60 may abut each other.

The vehicle 20 may include one or more tethers 36 and tether releases 38. The tethers 36 may be a same material as the airbags 30, or any suitable material. Each tether 36 may be fixed to one of the extensions 34 of the airbags 30, e.g., to the distal end 60 of one of the extensions 34 via stitching, adhesive, friction welding, etc. Each tether 36 may extend to one of the tether releases 38. Each tether release 38 may be supported by one of the interior components 26, e.g., the door 42, the center console 46, the housing 50, etc. Each tether release 38 may be operatively coupled to one of the tethers 36, e.g., to secure the tether 36 prior to actuation, and to actuate and release the tether 36, e.g., in response to an instruction from the computer 64. The tether release 38 may be of any suitable type for releasing or severing a tether. The tether release 38, for example, may be actuated electrically, mechanically, pneumatically, hydraulically, etc. and may include pin-type releases, cutter type releases, etc.

Figure 4:
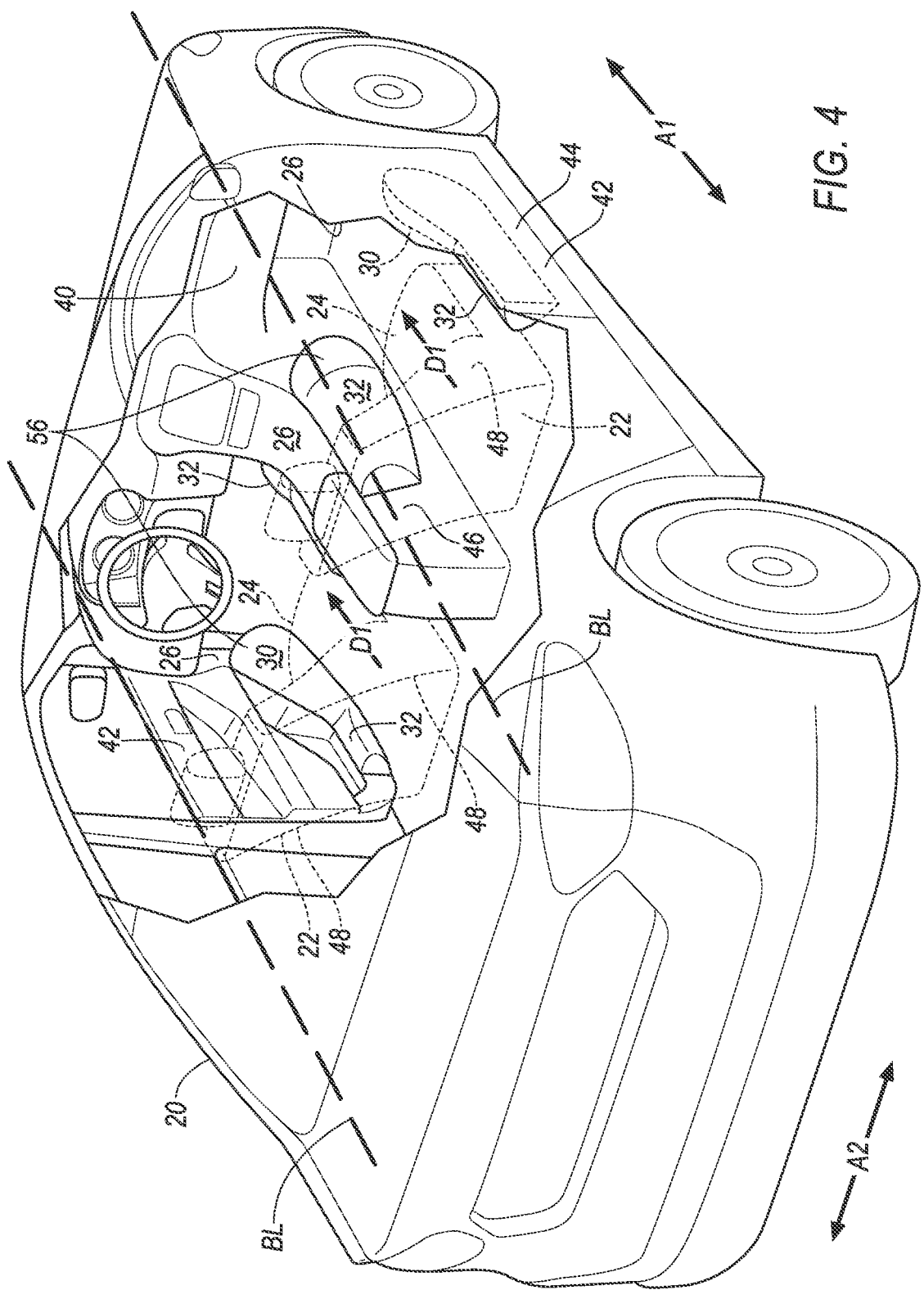
FIG. 4 is a perspective view of the vehicle having the airbags in second inflated positions.
Figure 5:
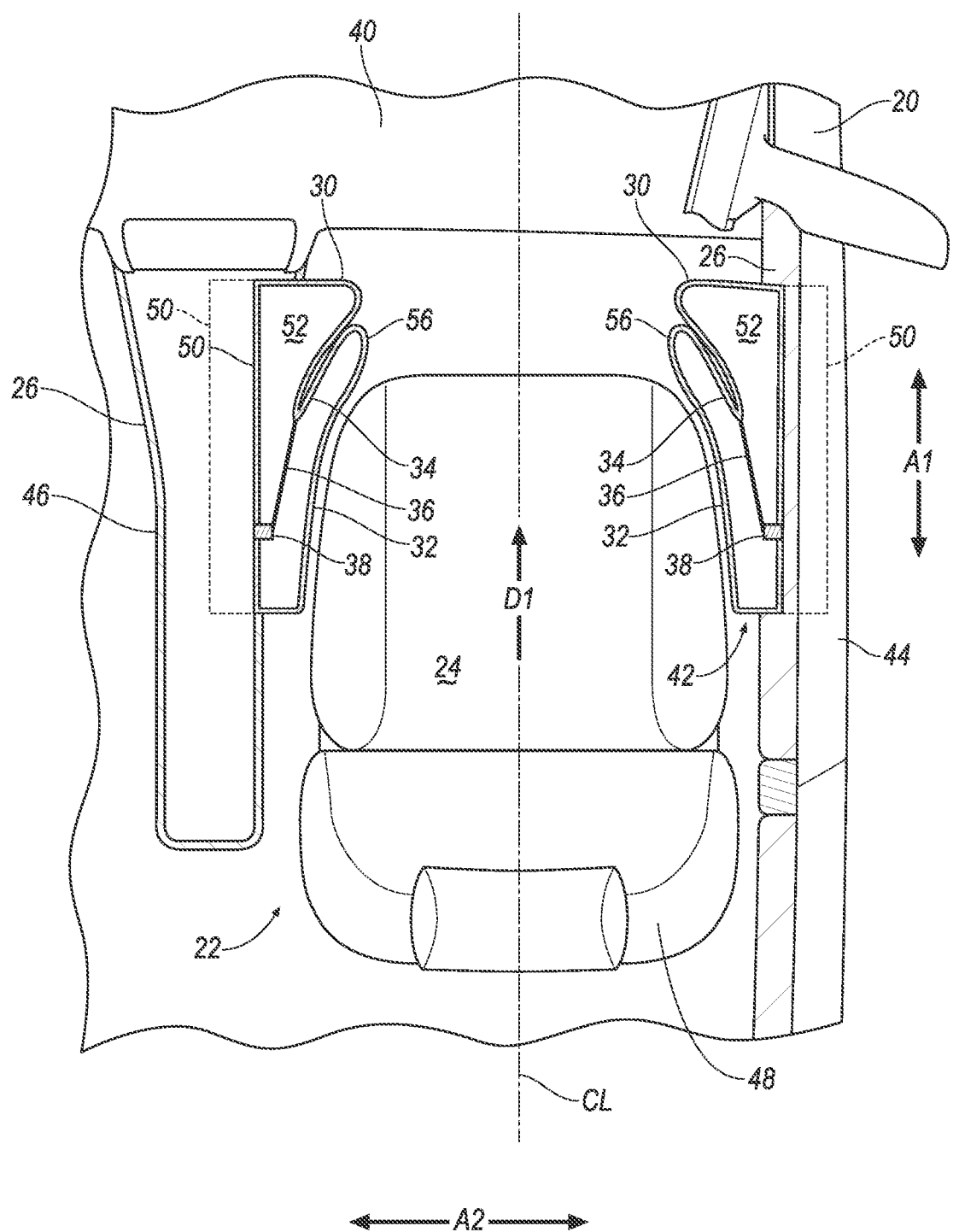
FIG. 5 is a top cross-section view of the vehicle having the airbags in the second inflated positions.

The tethers 36 and the tether releases 38 collectively control inflation of the airbags 30. After the tethers 36 are released from the tether releases 38 the airbags 30 may inflate to the first inflated positions. Before the tethers 36 are released, e.g., while the tethers 36 are operatively coupled to the tether releases 38, the airbags 30 may be inflatable to the second inflated positions, shown in FIGS. 4 and 5.

The airbags 30 in the second inflated positions may have the extension 34 in the main body 32. For example, the extension 34 may be in the chamber 52 of the main body 32 of the airbag 30 in the second inflated position. The extensions 34 in the main bodies 32 reduces a volume of the respective airbag 30, e.g., the chamber 52 of the main body 32 and the chamber 54 of the extension 34 of the airbag 30 in the first inflated position enclose a greater volume than the chamber 52 of the main body 32 in the second inflated position. The difference in volume enables the airbag 30 to inflate to the second inflated position in less time inflating to the first inflated position, provides greater firmness to the airbag 30 in the second inflated position than in the first inflated position, etc.

The vehicle 20 may include one or more airbags 130 be supported by the instrument panel 40, e.g., via one or more housings 50. The airbags 130 may be a same material as the airbags 30, or any suitable material. Each airbag 130 supported by the instrument panel 40 may be inflatable from an uninflated position, shown in FIG. 1, to an inflated position, shown if FIG. 2. The airbags 130 in the inflated positions are above the airbags 30 in the first inflated positions and/or the second inflated positions. For example, the airbag 130 supported by the instrument panel 40 in the inflated position may be above the extensions 34 of the airbags 30 in the first inflated positions, e.g., relative to an occupant of the seat 22, the top and bottom of the vehicle 20, etc. As another example, the airbag 130 supported by the instrument panel 40 in the inflated position may be between the roof of the vehicle 20 and the airbags 30 in the first inflated positions and/or the second inflated positions.

The housings 50 provide reaction surfaces for the airbags 30, 130 in the various inflated positions. The airbags 30, 130 may be disposed in respective housings 50 in the uninflated positions. The housing 50 may be supported at any suitable location of the vehicle 20. For example, the housing 50 may be supported by the door 42, the housing 50 may be supported by the center console 46, the housing 50 may be supported by the instrument panel 40, etc. The housings 50 may be formed of any suitable material, e.g., a rigid polymer, a metal, a composite, etc.

Figure 6:
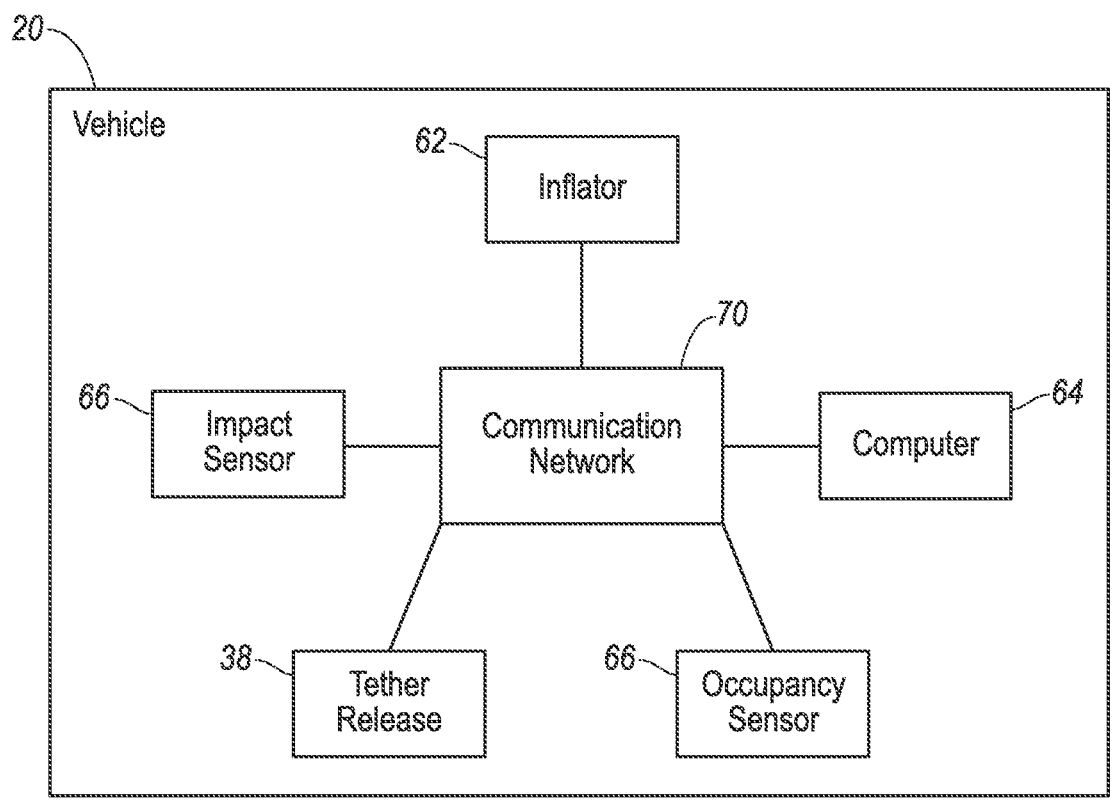
FIG. 6 is a block diagram of components of the vehicle.

The vehicle 20 may include one or more inflators 62, shown in FIG. 6. Each inflator 62 may be connected to the one of airbags 30, 130. Upon receiving a signal from, e.g., a computer 64, the inflators 62 may inflate the respective airbag 30, 130 with an inflatable medium, such as a gas. The inflators 62 may be, for example, pyrotechnic inflators that uses a chemical reaction to drive inflation medium to the airbags 30, 130. The inflators 62 may be of any suitable type, for example, cold-gas inflators. The inflators 62 may be disposed in respective housings 50.

Figure 7:
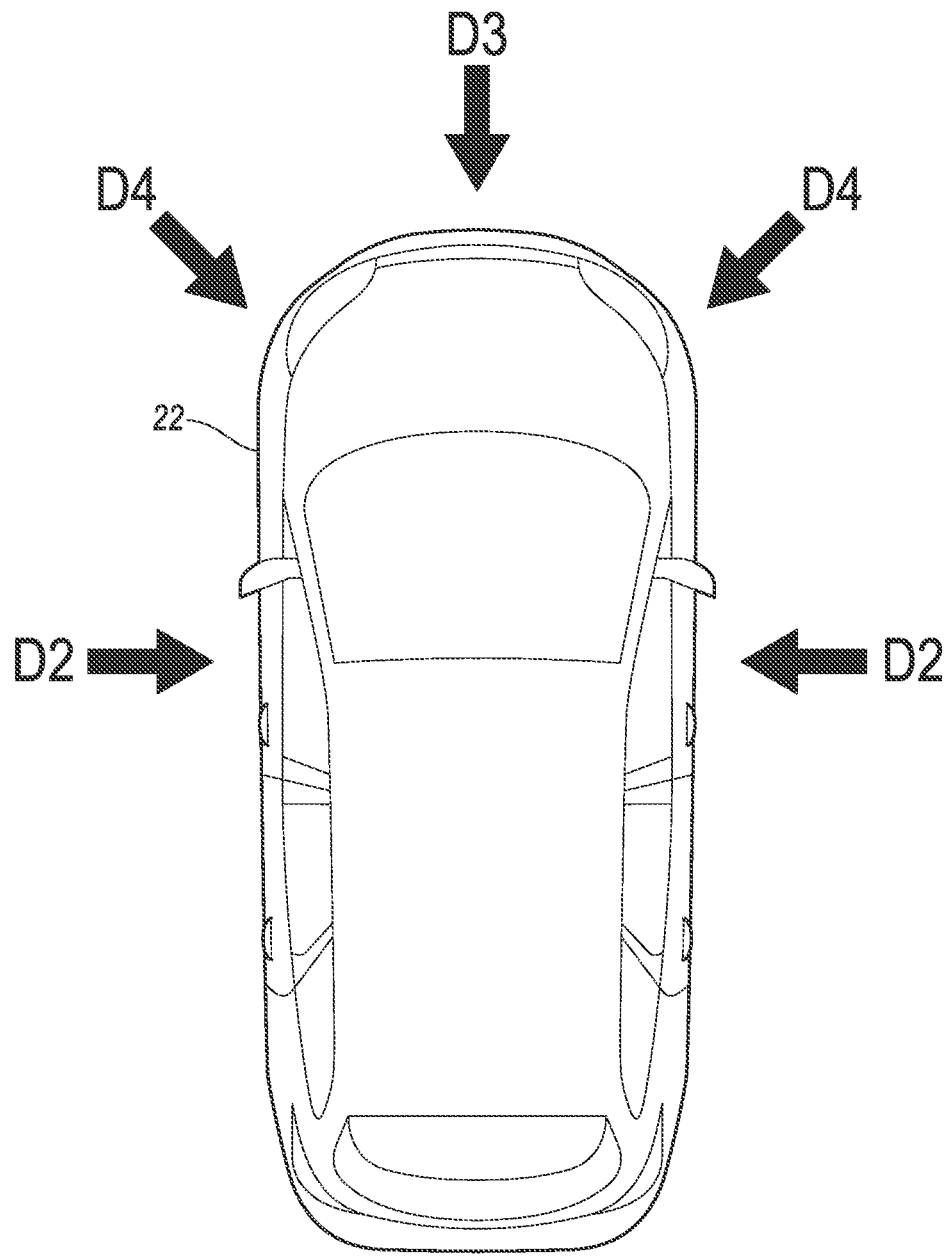
FIG. 7 is a top view of the vehicle illustrating vehicle impact directions.

The vehicle 20 may include an impact sensor 66. The impact sensor 66 may be in communication with the computer 64. The impact sensor 66 is programmed to detect an impact to the vehicle 20. The impact sensor 66 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 66 may be located at numerous points in or on the vehicle 20. The impact sensor 66 may detect a direction of an impact D2, D3, D4 to the vehicle 20, shown in FIG. 7 For example, the impact sensor 66 may detect the side impact D2, e.g., a broadside collision or T-bone collision. As another example, the impact sensor 66 may detect the front impact D3, e.g., a head-on collision, e.g., including moderate and small overlaps. As one more example, the impact sensor 66 may detect the oblique impact D4, e.g., an impact at an angle between the front impact D3 and the side impact D2.

The vehicle 20 may include an occupancy sensor 68, shown in FIG. 6, programmed to detect occupancy of the seat 22 of the vehicle 20. The occupancy sensor 68 may be visible-light or infrared cameras directed at the seat 22, weight sensors supported by the seat 22, sensors detecting whether a seat belt for the seat 22 is buckled or unspooled, or other suitable sensors.

The vehicle 20 may include a communication network 70. The communication network 70 includes hardware, such as a communication bus, for facilitating communication among vehicle components, e.g., the inflators 62, the computer 64, the impact sensor 66, the occupancy sensor 68, etc. The communication network 70 may facilitate wired or wireless communication among the vehicle components in accordance with a number of communication protocols such as computer area network (CAN), Ethernet, WiFi, Local Interconnect Network (LIN), and/or other wired or wireless mechanisms.

The computer 64 may be a microprocessor-based computer implemented via circuits, chips, or other electronic components. For example, the computer 64 may include a processor, memory, etc. The memory of the computer 64 may include memory for storing instructions executable by the processor as well as for electronically storing data and/or databases.

The memory of the computer 64 may store instructions to inflate the one or more of the airbags 30. For example, the computer 64 may transmit a signal through the communication network 70 to one or more of the inflators 62. In response, the inflators 62 may discharge and inflate the airbags 30, 130. The computer 64 may inflate one or more of the airbags 30, 130 in response to detecting a vehicle impact, e.g., based on information received from the impact sensor 66 via the communication network 70.

The memory of the computer 64 may store instructions to selectively inflate the airbags 30 to the first inflated positions and/or the second inflated positions. For example, the computer 64 may inflate one or more of the airbags 30 to the first inflated positions by releasing one or more of the tethers 36 in addition to inflating one or more of the airbags 30. For example, the computer 64 may release one or more of the tethers 36 by transmitting a signal through the communication network 70 to one or more of the tether releases 38. In response, the tether releases 38 may actuate and release the respective tethers 36 from being operative coupled to the respective tether releases 38.

The memory of the computer 64 may store instructions executable by the processor to inflate one or more of the airbags 30 and then actuate the tether release 38. For example, the computer 64 may first actuate one or more of the inflators 62, and then actuate one or more of the tether releases 38. Actuating one or more of the tether releases 38 after actuating one or more of the inflators 62 provides a variable firmness to the respective airbag 30. For example, such airbag 30 may initially be firmer after the inflator 62 is actuated and before the tether release 38 is actuated, and then be less firm after the tether release 38 is actuated. Actuating one or more of the tether releases 38 after actuating one or more of the inflators 62 provides a variable shape to the respective airbag 30. For example, such airbag 30 may initially be in the second inflated position after the inflator 62 is actuated and before the tether release 38 is actuated, and then be in the first inflated position after the tether release 38 is actuated.

The memory of the computer 64 may store instructions executable by the processor to actuate one more of the tether release 38 based on the direction D2, D3, D4 of a detected vehicle impact. For example, the memory of the computer 64 may store a look-up table or the like associating various directions D2, D3, D4 of detected vehicle impacts with an indication of whether to actuate one or more of the tether releases 38. An example look-up table is shown below:

TABLE 1

| Direction of Impact | Occupant Size Above Threshold? | Actuate Tether Release? |
|---|---|---|
| Front | n/a | Yes |
| Side | No | Yes |
| Side | Yes | No |
| Oblique | n/a | Yes |

Upon detecting a vehicle impact and detecting a direction of such impact, e.g., based on information received from the impact sensor 66, the computer 64 may determine whether or not to actuate one or more of the tether releases 38 based the direction of the detected impact and the associated indication of whether to actuate one or more of the tether releases 38 in the look-up table. Next, the computer 64 may inflate the airbag 30 and may, or may not, actuate one or more of the tether releases 38, e.g., based on the associated indication of whether to actuate one or more of the tether releases 38 in the look-up table. In addition to the indication of whether or not to actuate the tether release 38, the look-up table may also indicate a threshold amount of time to weight between actuating the inflator 62 and then actuating the tether release 38 (not shown in Table 1). For example, a threshold amount of time for an oblique impact may be greater than a threshold amount of time for a front impact.

The memory of the computer 64 may store instructions executable by the processor to actuate one or more of the tether releases 38 based on a detected occupant size. The computer 64 may identify the detected occupant size based on information from the occupancy sensor 68 received via the communication network 70, e.g., based on information from a weight sensor supported by the seat 22. Actuating the tether release 38 based on the detected occupant size allows the airbag 30 to have a firmness that corresponds to the occupant, e.g., a firmer airbag for a larger occupant and a softer airbag for a smaller occupant. For example, the look-up table or the like may include an association of whether an occupant size is above a threshold occupant size with an indication of whether to actuate one or more of the tether releases 38, as shown in Table 1 above. The threshold occupant size may be determined based on crash testing of the vehicle 20, based on crash test protocols, e.g., standard crash test dummies sizes, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
a seat having a seat bottom and defining a seat-forward direction;
an interior component;
an airbag supported by the interior component and inflatable to a first inflated position having a main body elongated along a vehicle-longitudinal axis extending in the seat-forward direction and an extension extending from the main body transverse to the vehicle-longitudinal axis in front of the seat bottom relative to the seat-forward direction; and
a tether fixed to the extension and a tether release operatively coupled to the tether;
wherein the airbag is inflatable to a second inflated position having the extension inverted into the main body and extending vehicle-rearward before the tether is released.

2. The vehicle of claim 1, further comprising a processor and a memory storing instructions executable by the processor to actuate the tether release based on a direction of a detected vehicle impact.

3. The vehicle of claim 1, further comprising a processor and a memory storing instructions executable by the processor to actuate the tether release based on a detected occupant size.

4. The vehicle of claim 1, further comprising a processor and a memory storing instructions executable by the processor to inflate the airbag and then actuate the tether release.

5. The vehicle of claim 1, wherein the airbag in the first inflated position is L-shaped after the tether is released.

6. The vehicle of claim 1, wherein the extension is at a front of the main body relative to the seat-forward direction.

7. The vehicle of claim 1, wherein the interior component is a door.

8. The vehicle of claim 1, wherein the interior component is a center console.

9. The vehicle of claim 1, wherein the extension extends in a cross-vehicle direction.

10. The vehicle of claim 1, further comprising an instrument panel, the extension of the airbag in the first inflated position between the seat bottom and the instrument panel.

11. The vehicle of claim 10, further comprising a second airbag supported by the instrument panel and inflatable to an inflated position above the airbag in the first inflated position.

12. The vehicle of claim 1, wherein the extension is spaced from the seat bottom in the seat-forward direction.

13. The vehicle of claim 1, wherein the seat bottom defines a centerline, and the extension extends toward the centerline.

14. The vehicle of claim 1, wherein the airbag is supported below a vehicle-beltline.

15. The vehicle of claim 1, wherein the airbag in the first inflated position is completely below a vehicle-beltline.

16. The vehicle of claim 1, further comprising a second interior component and a second airbag supported by the second interior component and inflatable to an inflated position having a second extension, the extension and the second extension extending toward each other.

17. The vehicle of claim 16, wherein the interior component is a center console and the second interior component is a door.

18. The vehicle of claim 17, wherein the extension in the first inflated position abuts the second extension in the inflated position.

\* \* \* \* \*